United States Patent [19]
Wike, Jr.

[11] Patent Number: 5,298,729
[45] Date of Patent: Mar. 29, 1994

[54] MULTIPLE DEPTH OF FIELD OPTICAL SCANNER
[75] Inventor: Charles K. Wike, Jr., Sugar Hill, Ga.
[73] Assignee: NCR Corporation, Dayton, Ohio
[21] Appl. No.: 838,989
[22] Filed: Feb. 14, 1992
[51] Int. Cl.$^5$ .............................................. G06K 7/10
[52] U.S. Cl. .................................. 235/467; 359/198; 359/216
[58] Field of Search ............... 359/196, 198, 216, 217, 359/218, 219; 235/467; 250/230, 233, 234, 235, 236; 358/481

[56] References Cited
U.S. PATENT DOCUMENTS 4,082,417  4/1978  Runciman et al. ................... 350/6.8
5,007,691  4/1991  Bobba et al. .......................... 350/6.7
5,059,779 10/1991  Krichever et al. ................... 235/462
5,175,421 12/1992  Harris ................................... 235/467

Primary Examiner—Donald Hajec
Assistant Examiner—Adrian Young
Attorney, Agent, or Firm—Paul W. Martin

[57] ABSTRACT

A multiple depth of field optical scanner employing a mirrored spinner which is rotated about a predetermined point between the geometric center and the periphery of the spinner. The rotation point is preferably located to provide the maximum variation in depth of field that will still allow a laser to continuously illuminate the spinner as it rotates. The spinner may be additionally rotated about its geometric center, if desired.

14 Claims, 7 Drawing Sheets

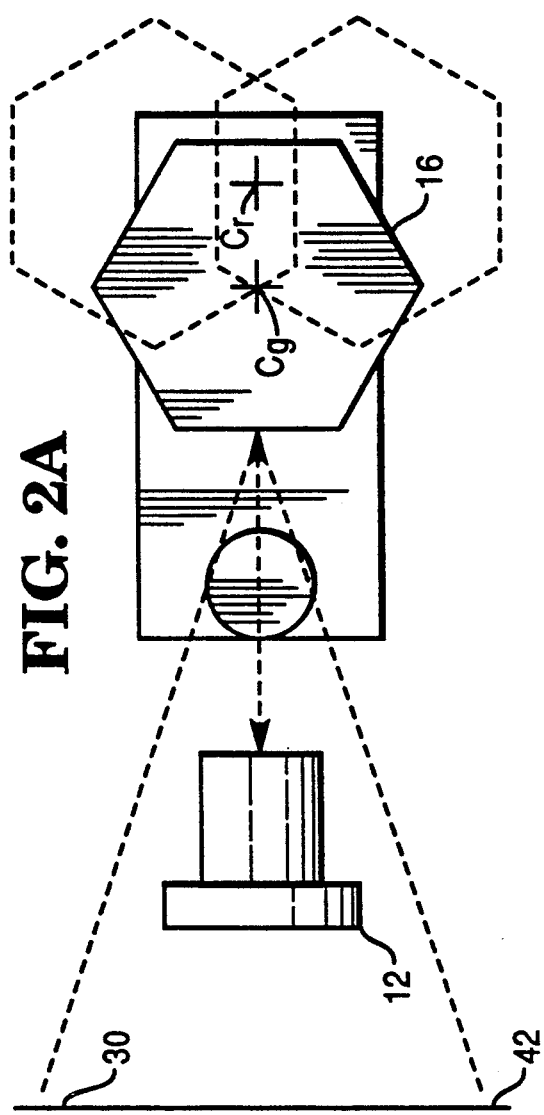

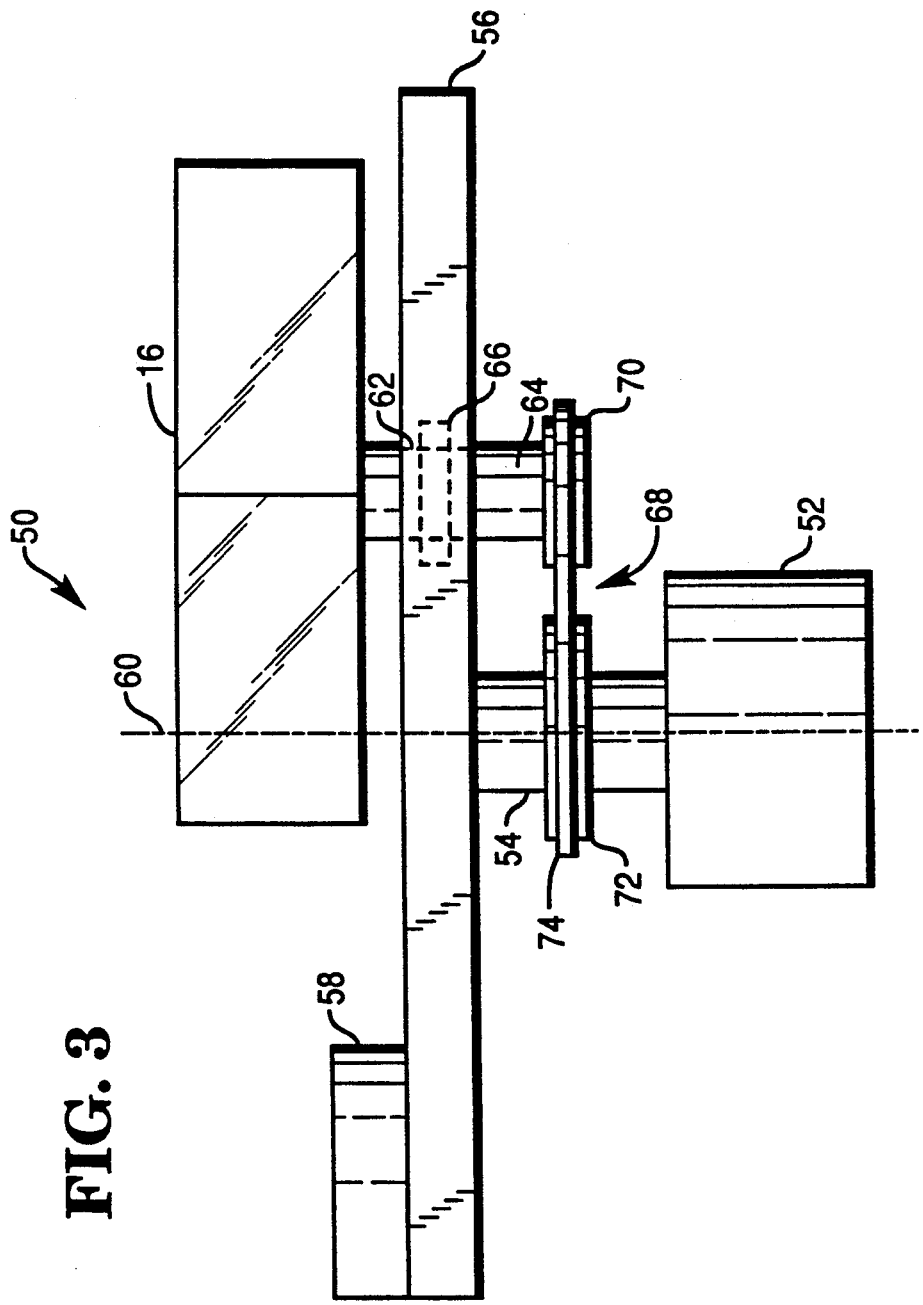

MULTIPLE DEPTH OF FIELD OPTICAL SCANNER

CROSS-REFERENCE TO RELATED APPLICATION

The present invention is related to commonly-assigned U.S. patent application entitled "Dual Depth of Field optical Scanner", invented by Wike, Jr. et al. and having a Ser. No. 07/781,622.

BACKGROUND OF THE INVENTION

The present invention relates to optical scanners and more specifically to a multiple depth of field optical scanner.

Optical scanners are well known for their usefulness in retail checkout and inventory control. Optical scanners generally employ a laser diode, the light from which is focused and collimated to produce a scanning beam. An optical transceiver directs the beam against a plurality of stationary mirrors, and collects the beam after it is reflected by a bar code label. A motor rotates the optical transceiver, and a detector receives the returning beam. The pattern produced by such a scanner is characterized by lines oriented at various angles to one another. An example of an optical scanner can be found in commonly assigned U.S. Pat. No. 4,971,410, entitled, "Scanning and Collection System for a Compact Laser", issued Nov. 20, 1990, to Wike, Jr. et al. This patent is hereby incorporated by reference.

Multiple depths of field are desirable to increase the range from the scanner at which a scanner can read a given size of bar in a label, but have been difficult to implement. Some designs have included reciprocally oscillating mirrors.

Therefore, it would be desirable to produce an optical scanner which produces multiple depths of field, but which does not include a reciprocating mirror.

SUMMARY OF THE INVENTION

In accordance with the teachings of the present invention, a multiple depth of field optical scanner is provided. The optical scanner includes a mirrored spinner which rotates about a predetermined point between the geometric center and the periphery of the spinner, a laser for producing scanning light beams, and an apparatus for rotating the mirrored spinner.

The apparatus for rotating the mirrored spinner may include a motor, a shaft coupled to the motor and having a central axis, a support member mounted to the first shaft and having first and second sides, and a counterweight mounted on the first side of the support member. The spinner is mounted on the first side such that the rotation point is in line with the axis.

It is a feature of the present invention that the predetermined rotation point comprises one which maximizes variation in depth of field while being one at which the laser continuously illuminates the mirrored spinner as it rotates about the point.

It is accordingly an object of the present invention to provide a multiple depth of field optical scanner.

It is another object of the present invention to provide a multiple depth of field optical scanner which produces a scan pattern having scan lines at different focal planes.

It is another object of the present invention to provide a multiple depth of field optical scanner which employs a mirrored spinner which rotates about a predetermined point between the geometric center and the periphery of the spinner.

It is another object of the present invention to provide a mirrored polygon spinner, including a plurality of facets having exterior reflective surfaces, which rotates about a predetermined point between the geometric center and the periphery of the spinner.

It is another object of the present invention to provide an apparatus for rotating a mirrored spinner about a predetermined point between the geometric center and the periphery of the spinner.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2a is a top view of a representation of a spinner within the optical scanner in a first position;

FIG. 3 is a side view of a first drive apparatus for the spinner;

DETAILED DESCRIPTION OF THE PREFERRED EMBODIMENT

Figure 1:
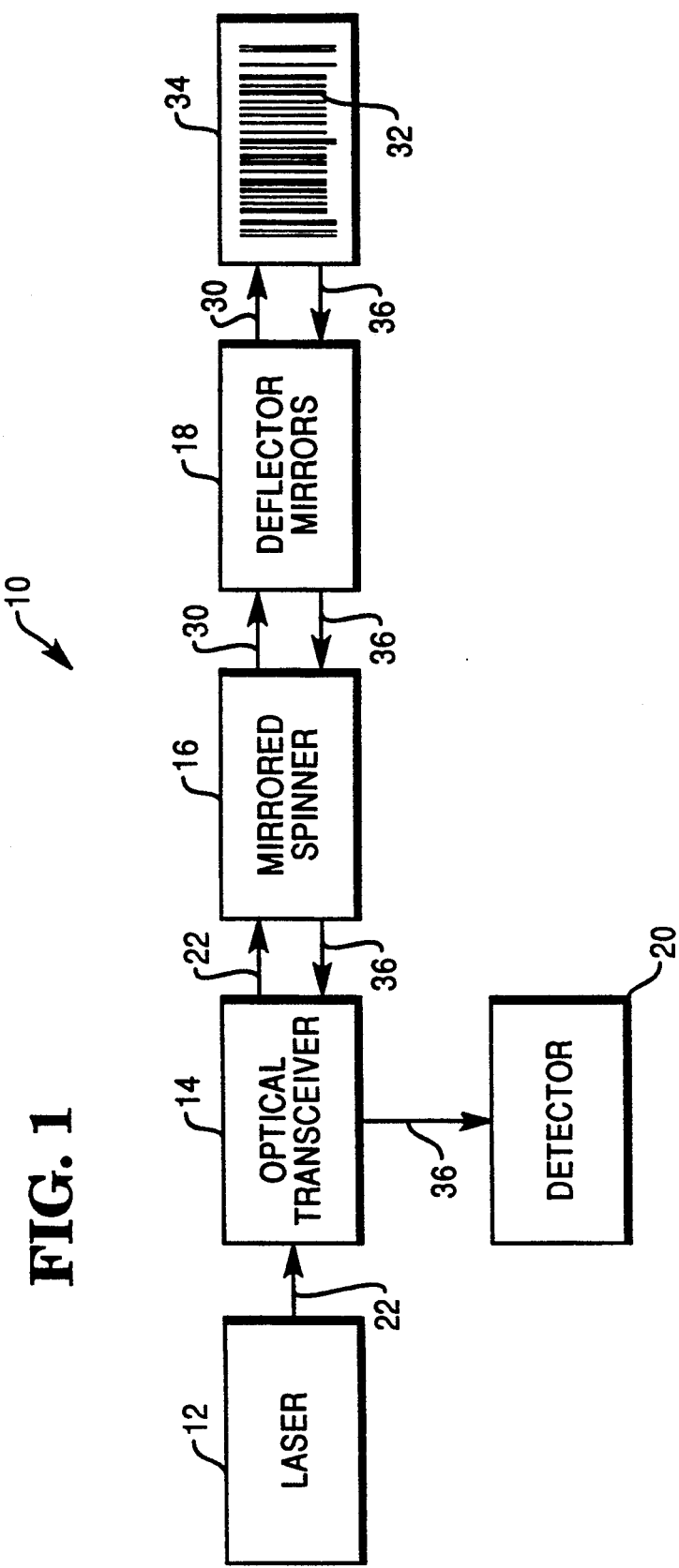
FIG. 1 is a block diagram of the optical scanner of the present invention.

Referring now to FIG. 1, multiple depth of field optical scanner 10 of the present invention includes laser 12, optical transceiver 14, mirrored spinner 16, deflector mirrors 18, and photodetector 20. Laser 12 includes a laser diode, a focusing lens, and a collimating aperture.

Beam 22 passes through optical transceiver 14, which includes a mirrored collecting surface and an aperture for passing beam 22.

Beam 22 contacts motor-driven mirrored spinner 16, which rotates about a predetermined center of rotation between its geometric center and its periphery. Preferably, mirrored spinner 16 is a polygon having six mirrored facets for producing scan lines 30. The facets may be oriented at various elevations angles to achieve predetermined scan patterns.

Deflector mirrors 18 direct scan lines 30 across a predetermined scanning path. Scan lines 30 impact bar code label 32 of item 34 and the reflected light 36 is redirected by spinner 16 to optical transceiver 14.

Optical transceiver 14 directs light 36 to photodetector 20, which generates signals representing the intensity of light 36.

Figure 2B:
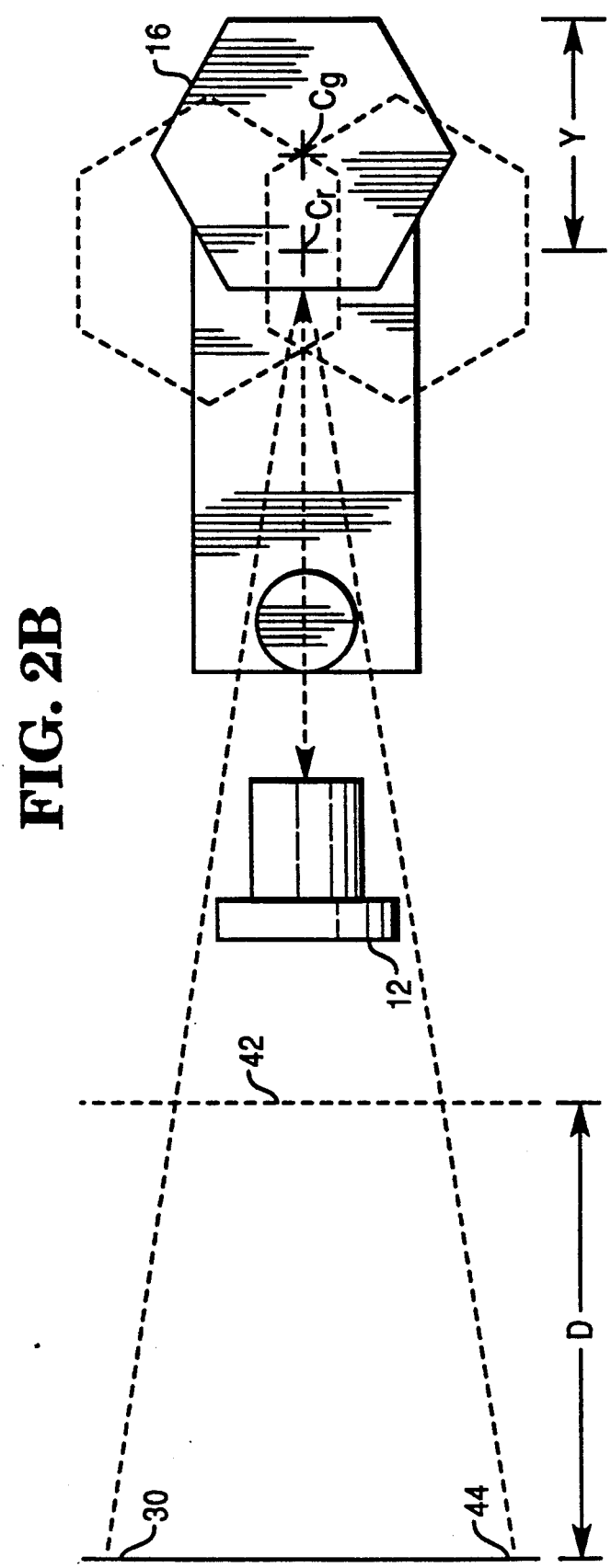
FIG. 2b is a top view of a representation of the spinner in a second position.

Referring now to FIGS. 2A and 2B, spinner 16 rotates about a predetermined center of rotation Cr between its geometric center Cg and its periphery 40 to produce a scan pattern at a predetermined number of planes between a near focal plane 42 and a far focal plane 44. In FIG. 2A, mirrored spinner 16 is shown in a first position, which produces far focal plane 44. Several other positions are shown as dashed lines. In FIG.

2B, mirrored spinner is shown in a second position one-hundred-and-eighty degrees away from the first position to produce focal plane 42. Several other positions are shown as dashed lines. The distance D between near and far focal planes 42 and 44 is equal to twice the maximum distance Y between periphery 40 and center of rotation Cr.

Spinner positions between the first and second positions produce a predetermined number of focal planes equal to the number of spinner facets. Center of rotation Cr is preferably located such that distance D is the maximum amount that permits laser 12 to illuminate spinner 16 in any of its positions around center of rotation Cr. Preferably, distance D is about six inches.

Figure 4:
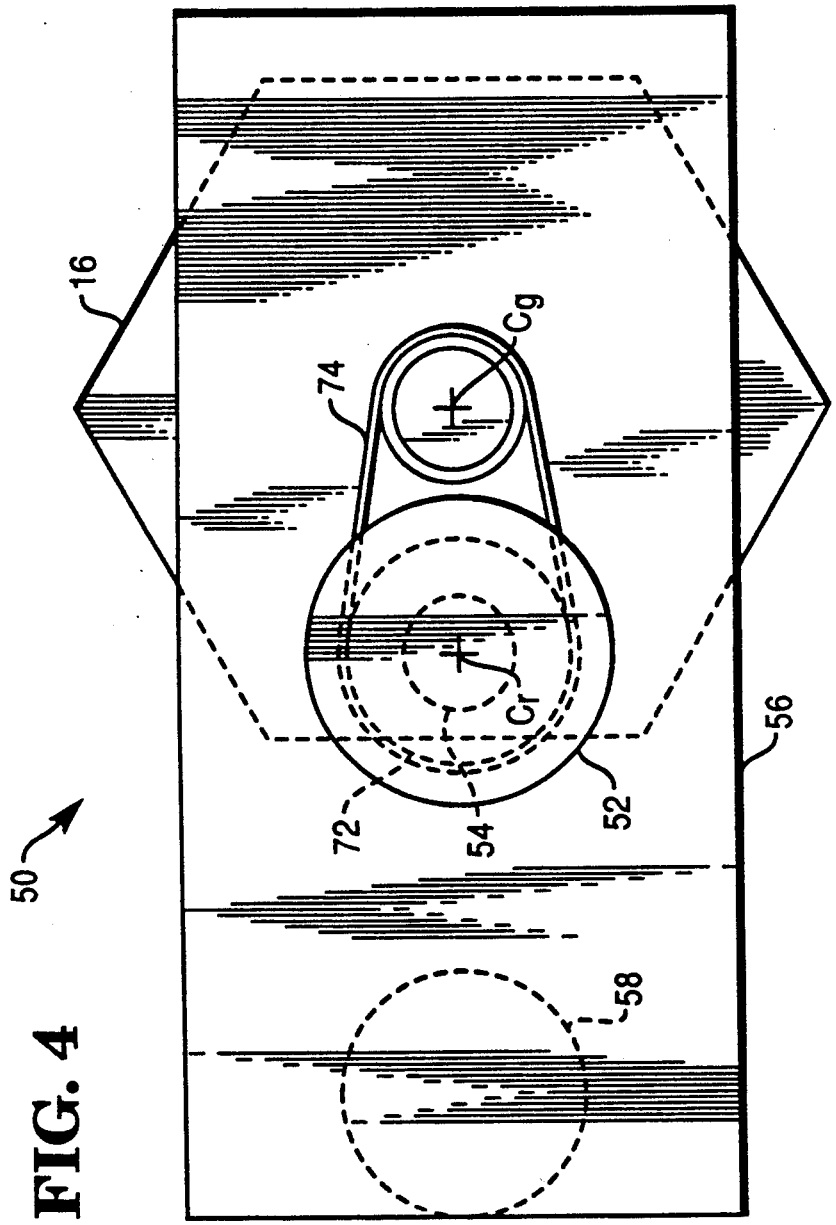
FIG. 4 is a bottom view of the drive apparatus of FIG. 3.
Figure 5:
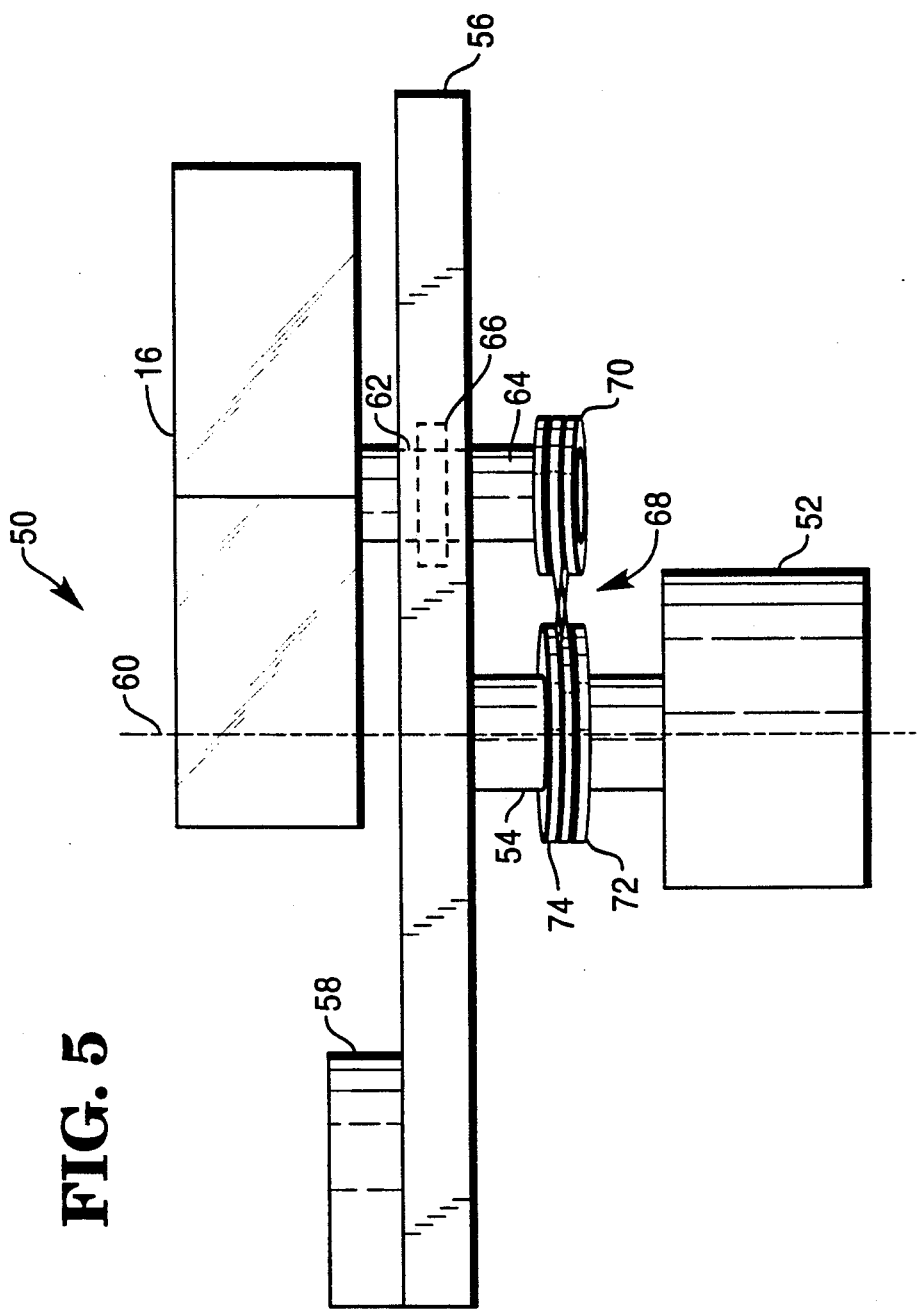
FIG. 5 is a side view of a second drive apparatus for the spinner.
Figure 6:
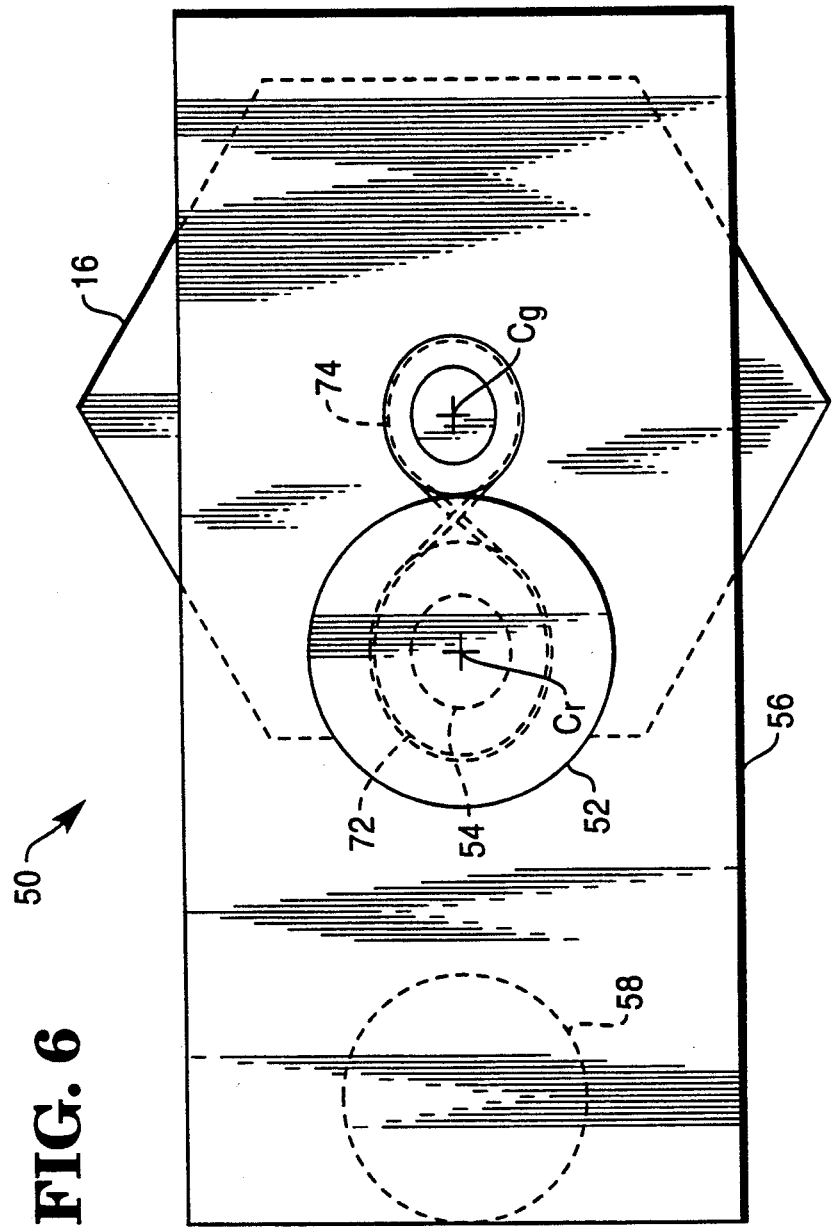
FIG. 6 is a bottom view of the drive apparatus of FIG. 5.

Turning now to FIGS. 3 and 4, apparatus 50 for rotating mirrored spinner 16 is shown. Apparatus 50 primarily includes motor 52, shaft 54 coupled to motor 52, support member 56 coupled to shaft 54, and counterweight 58 mounted on support member 56.

Spinner 16 is mounted on top of support member 56 opposite counterweight 58 such that center of rotation Cr is in line with axis 60 of shaft 54. Spinner 16 may be mounted directly to support member 56 and rotate with it, or spinner 16 may be mounted so as to rotate independently of and faster than support member 56.

In the latter case, support member 56 is provided with an aperture 62 through which a second shaft 64, connected at one end to spinner 16, located. A bearing 66 may also be provided and seated within aperture 62. The other end of shaft 64 is coupled through a drive apparatus 68 to shaft 54. Preferably, pulleys 70 and 72 are employed and coupled using drive belt 74. Pulley 72 has a larger radius than pulley 70 to cause pulley 70 and spinner 16 to rotate faster than pulley 72 and support member 56. The ratio of the radii of pulleys 70 and 72 is determined by the operating speed of motor 52 and the desired speed of spinner 16. Pulleys 70 and 72 and belt 74 may be configured so that the first and second shafts rotate in either the same direction or opposite directions.

Although the invention has been described with particular reference to certain preferred embodiments thereof, variations and modifications of the present invention can be effected within the spirit and scope of the following claims.

What is claimed is:

1. An optical scanner comprising a mirrored spinner which rotates about a predetermined point between the geometric center and the periphery of the spinner and which includes a polygon having a predetermined number of reflective facets mounted side-by-side to form the periphery.

2. The optical scanner as recited in claim 1, further comprising means for rotating the mirrored spinner.

3. The optical scanner as recited in claim 2, further comprising a laser for producing scanning light beams.

4. The optical scanner as recited in claim 1, wherein the number of facets comprises six.

5. The optical scanner as recited in claim 3, wherein the predetermined rotation point comprises one at which the laser continuously illuminates the mirrored spinner as it rotates about the point.

6. The optical scanner as recited in claim 3, wherein the predetermined rotation point comprises one which maximizes variation in depth of field while being one at which the laser continuously illuminates the mirrored spinner as it rotates about the point.

7. The optical scanner as recited in claim 3, wherein the rotating means comprises:
   a motor;
   a shaft coupled to the motor and having a central axis;
   a support member mounted to the shaft and having first and second sides, the spinner being mounted on the first side such that the rotation point is in line with the axis; and
   a counterweight mounted on the first side of the support member.

8. The optical scanner as recited in claim 3, wherein the rotating means comprises:
   a first shaft having a central axis and first and second ends;
   a motor coupled to the first end of the first shaft;
   a support member mounted to the second end of the first shaft and having first and second sides, the support member having an aperture;
   a counterweight mounted on the first side of the support member;
   a second shaft having first and second ends and being rotationally positioned through the aperture in the support member, the spinner being mounted to the first end such that the rotation point is in line with the axis; and
   drive means coupled between the first and second ends of the first and second shafts for rotating the second shaft and the spinner at a predetermined speed when the first shaft rotates.

9. The optical scanner as recited in claim 8, wherein the drive means comprises:
   a first pulley on the first shaft;
   a second pulley on the second shaft; and
   a drive belt positioned around the first and second pulleys.

10. An optical scanner comprising:
    a mirrored spinner which rotates about a predetermined point between the geometric center and the periphery of the spinner and spaced from the geometric center, including a polygon having a predetermined number of mirrored facets;
    a laser for producing scanning light beams; and
    means for rotating the mirrored spinner, including a motor, a shaft coupled to the motor and having a central axis, a support member mounted to the first shaft for rotation and having first and second sides, the spinner being mounted on the first side such that the rotation point of the spinner is in line with the axis, and a counterweight mounted on the first side of the support member;
    wherein the predetermined rotation point comprises one which maximized variation in depth of field while being one at which the laser continuously illuminates the mirrored spinner as it rotates about the point.

11. A method for producing a multiple depth of field scan pattern comprising the steps of:
    (a) providing a mirrored spinner which is a polygon having a predetermined number of reflective facets mounted side-by-side to form the periphery;
    (b) illuminating the mirrored spinner with a laser beam; and
    (c) rotating the mirrored spinner about a predetermined point between the geometric center and the periphery of the mirrored spinner and spaced from the geometric center.

12. The method as recited in claim 11, wherein the rotation point comprises one at which the laser beam continuously illuminates the mirrored spinner as it rotates.

13. An optical scanner comprising:
- a mirrored spinner which rotates about a predetermined point between the geometric center and the periphery of the spinner;
- means for rotating the mirrored spinner including a first shaft having a central axis and first and second ends, a motor coupled tot he first end of the first shaft, a support member mounted to the second end of the first shaft and having first and second sides, the support member having an aperture, a counterweight mounted on the first side of the support member, a second shaft having first and second ends and being rotationally positioned through the aperture in the support member, the spinner being mounted to the first end such that the rotation point is in line with the axis, and drive means coupled between the first and second ends of the first and second shafts for rotating the second shaft and the spinner at a predetermined speed when the first shaft rotates; and
- a laser for producing scanning light beams.

14. The optical scanner as recited in claim 13, wherein the drive means comprises:
- a first pulley on the first shaft;
- a second pulley on the second shaft; and
- a drive belt positioned around the first and second pulleys.

* * * * *